United States Patent
Daoud

[19]

[11] Patent Number: 6,055,299
[45] Date of Patent: Apr. 25, 2000

[54] CONNECTOR BLOCK WITH BUILT-IN ARRAY TEST FEATURE

[75] Inventor: Bassel Hage Daoud, Parsippany, N.J.

[73] Assignee: Lucent Technologies Inc., Murray Hill, N.J.

[21] Appl. No.: 09/045,170

[22] Filed: Mar. 19, 1998

[51] Int. Cl.[7] .............................. H04M 1/24; H04M 3/08; H04M 3/22

[52] U.S. Cl. .................................. 379/12; 379/1; 379/21; 379/27; 379/397; 379/399; 439/342

[58] Field of Search .................................. 379/1, 21, 27, 379/29, 397, 399; 439/342

[56] References Cited

U.S. PATENT DOCUMENTS

| | | | |
|---|---|---|---|
| 3,976,849 | 8/1976 | Champan | 179/175.25 |
| 4,012,096 | 3/1977 | DeLuca et al. | 339/18 R |
| 4,585,290 | 4/1986 | Knickerbocker et al. | 339/97 |
| 4,595,799 | 6/1986 | Krob et al. | 379/17 |
| 4,736,403 | 4/1988 | McAlevey et al. | 379/26 |
| 4,756,017 | 7/1988 | Bush | 379/23 |
| 4,932,051 | 6/1990 | Karan et al. | 379/399 |
| 5,044,979 | 9/1991 | Siemon et al. | 439/404 |
| 5,966,439 | 10/1999 | Clavel | 379/399 |

*Primary Examiner*—Paul Loomis
*Assistant Examiner*—Quoc Tran

[57] ABSTRACT

A connector block including a built in test device for testing a pair of wires connected to the block. The connection block includes a first terminal that is connected to a first one of the pair of wires and a second terminal that is connected to a second one of the pair of wires. A test board is slideably mounted on the connector block for slideable movement between a test position and an inactive position. A current indicator is disposed on the test board so that when the test board is in the test position, the current indicator forms an electrical connection between the first terminal and the second terminal indicating the presence of an electric current.

14 Claims, 6 Drawing Sheets

CONNECTOR BLOCK WITH BUILT-IN ARRAY TEST FEATURE

FIELD OF THE INVENTION

This invention relates to a connector block, and in particular, to a connector block incorporating a test device for testing wiring connections made to the connector block.

BACKGROUND OF INVENTION

In a telephone network, a network cable from the central office is connected to a building entrance protector (BEP) located at the customer site, where the individual telephone lines are broken out line by line. The network cable, which consist of a plurality of tip-ring wire pairs that each represent a telephone line, is typically connected to a connector block that is an integral part of the BEP. Such connectors may be, for example, the ubiquitous 66-type punch down connector, or an SC 99 type connector block, such as are available from Lucent Technologies Inc.

A connector block has two sides: a top side which contains a plurality of wire connectors, sometimes called insulation displacement connectors (IDCs), for connecting the tip-ring wire pairs to the connecting block, and a bottom side which contains a plurality of wire-wrap terminals with each terminal being electrically connected to a corresponding IDC. The customer telephone equipment is coupled through the connector block to a central office (CO) telephone line. The CO line side of the connector is generally the bottom side of the connector block, where the CO line tip-ring wire pairs are connected using a wire-wrapping tool.

In order to verify that a network cable is properly installed and that a loop condition exists between each tip-ring wire pair and the central office, the electrical connection between each tip-ring wire pair and the corresponding IDCs is tested. Testing is typically performed by connecting a volt meter, telephone test set or other test device to the IDC terminals that correspond to the particular tip-ring wire pair under test. If a current flow is detected, or a dial tone is heard, depending on the test methodology, then a loop condition exists for that particular tip-ring wire pair. If no loop condition is found, either an electrical open or short exists on the network (CO) side of the connector, or a connection to or in the terminal block is defective. Each tip-ring wire pair is tested in this manner until a loop condition is verified for all wire pairs connected to the connector block.

A significant drawback of prior art connector blocks is that because each tip-ring wire pair must be individually loop tested, testing is very time consuming and prone to error, and typically accounts for a significant amount of the installation time of a BEP, cross connect filed or the like. Installation time would be significantly reduced if testing could be simplified.

SUMMARY OF THE INVENTION

The present invention is directed at overcoming the shortcomings of the prior art. The present invention provides a connector block having an integrated, built in test device for simultaneously testing all tip-ring wire pairs that are connected to the connector block. This enables an installer, in a single, easily verifiable step, to determine whether a proper loop condition exists between the central office and the connector block for each telephone line connected to the connector block.

The test device includes a test circuit board that is slideably mounted on the connector block for slideable movement between a test position and an inactive position. A current indicator, preferably a light-emitting diode (LED), is disposed on the test circuit board adjacent each pair of wire wrap terminals that correspond to a particular tip-ring wire pair. When the test circuit board is slideably moved into the test position, the current indicator forms an electrical connection between the terminals of the tip-ring wire pair. If the current indicator detects the presence of an electric current, a loop condition exists between the tip-ring wire pair under test and the central office. If no current is detected, then either an electrical short or open exists between the tip-ring wire pair under test and the central office. For testing CO lines, the current indicator is a light emitting diode (LED) which lights in the presence of the standard 48 volts d.c. present on a typical CO line. The system is readily useable and adaptable to test other line connections, such as those to private branch exchanges (PBXs) or electronic key equipment, for example.

When loop testing is not being performed, the test circuit board is biased to an inactive position wherein no electrical connection is formed between the terminals corresponding to the tip-ring wire pair and normal telephone operations can occur.

Because the test circuit board contains one current indicator for each terminal pair included in the connector block, loop testing for all connected tip-ring wire pairs may be performed simultaneously by simply placing the test circuit board in the test position and observing which current indicators are activated.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

DESCRIPTION OF THE DRAWING FIGURES

In the drawing figures, which are not to scale, and which are merely illustrative, and wherein like reference numerals depict like elements throughout the several views.

DETAILED DESCRIPTION OF THE PREFERRED EMBODIMENTS

Figure 1:
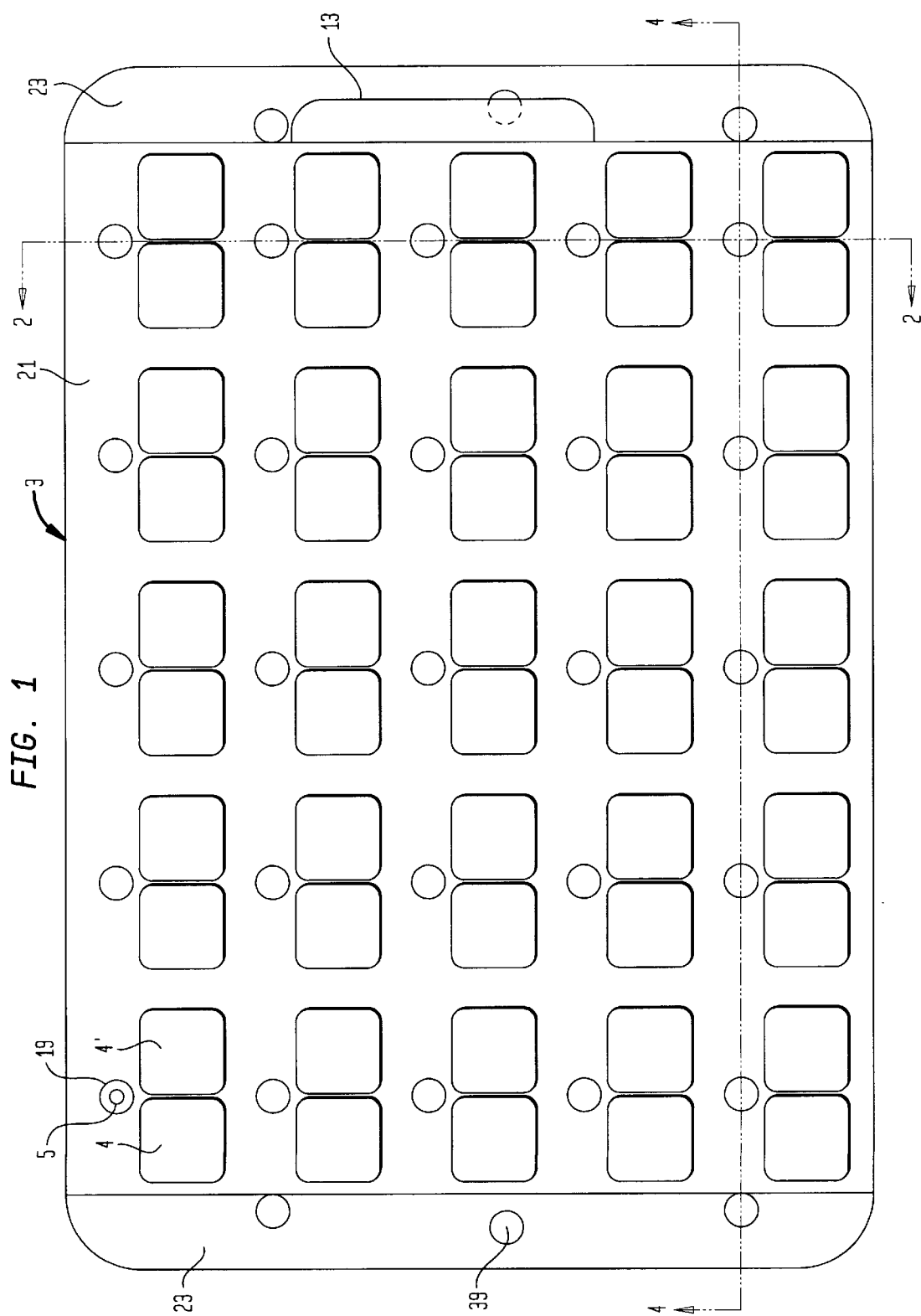
FIG. 1 is a top view of a connector block constructed in accordance with the present invention.

Referring now to FIGS. 1–4, there is shown a connector block 3 constructed in accordance with the present invention. Connector block 3 includes a base 21, which is preferably constructed from hard plastic, but may also be constructed from any rigid, non-conducting material known in the art and typically applied for constructing such electrical devices. Mounted on the top surface of connector block 3 are a plurality of connectors, such as, by way of nonlimiting example, insulation displacement connector (IDC) pairs 4, 4'. Although preferably shown as IDC connectors, the connectors 4, 4' may be any type of art-recognized connector. Located adjacent each IDC pair 4, 4' is an opening 19 through which a test indicator 5, described below, may be viewed.

Figure 4:
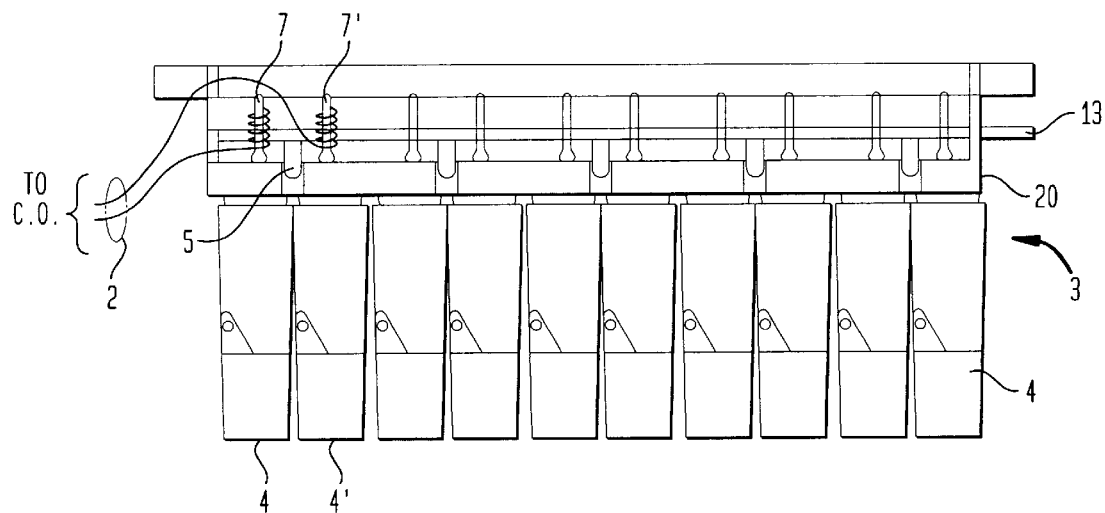
FIG. 4 is a side cross-sectional view taken along section 4—4 of FIG. 1.
Figure 5:
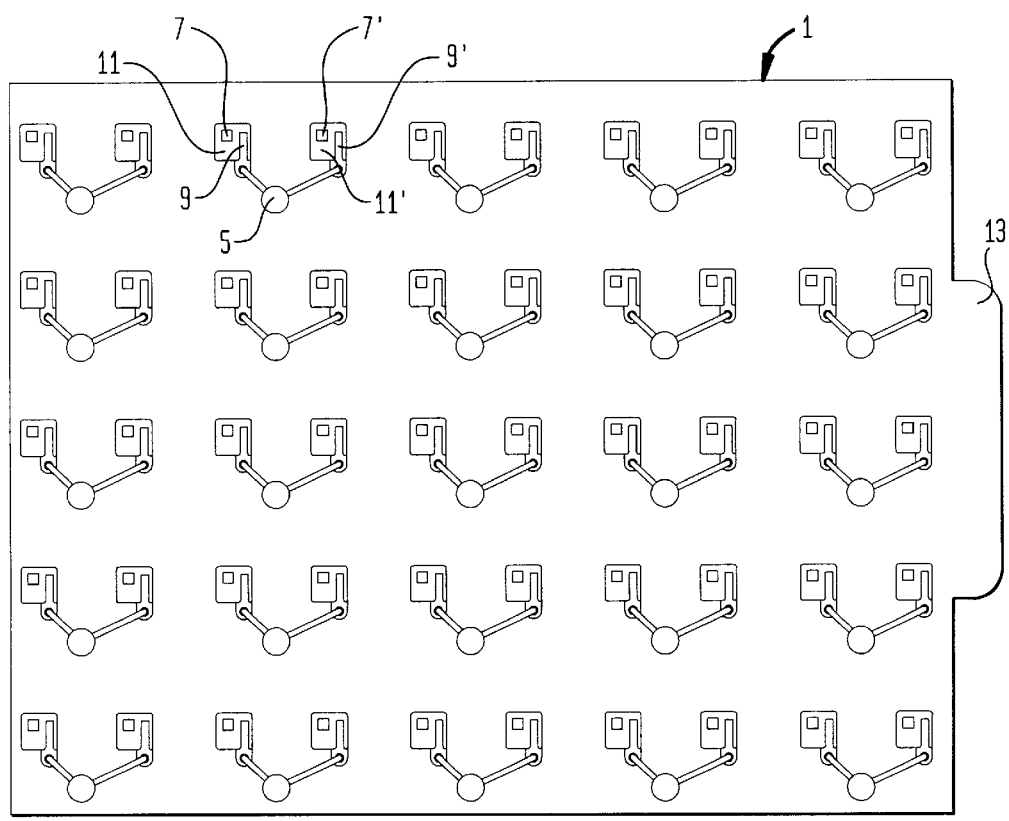
FIG. 5 is a top view of the test circuit board of the present invention in the inactive position.

As seen in FIG. 4, each of a plurality of tip-ring wire pairs 2 are associated with one central office (CO) telephone line for forming an electrical connection between the central office related telephone equipment through connector block 3. Such a connector block may be, for example, a type SC 99 connector block, as sold by Lucent Technologies Inc., or the well known 66-type connector block, or any other art-recognized connector block utilizing metallic terminals, such as, for example, wire wrap terminals, on one side of the block for terminating telephone lines. The person of skill will also recognize that although in a preferred embodiment the device is described in connection with CO lines, the device of the present invention may be used and adapted to test connections in numerous applications, such as, for example, PBXs, key systems, data networks, or any other application wherein connector blocks are used to facilitate electrical connections among pairs of electrically conductive wires.

Referring once again to FIG. 4, on the bottom side of connector block 3 there are a plurality of wire-wrap terminal pairs 7, 7' with each of terminal pair 7, 7' being electrically connected to a respective one of IDC pair 4, 4'. A pair of wires 2, each representing a telephone line and extending from a central office, are attached to terminal pairs 7, 7' using a conventional wire-wrapping tool so that an electrical connection may be formed between customer telephone equipment and the central office through the connector block in an art-recognized manner.

Figure 2:
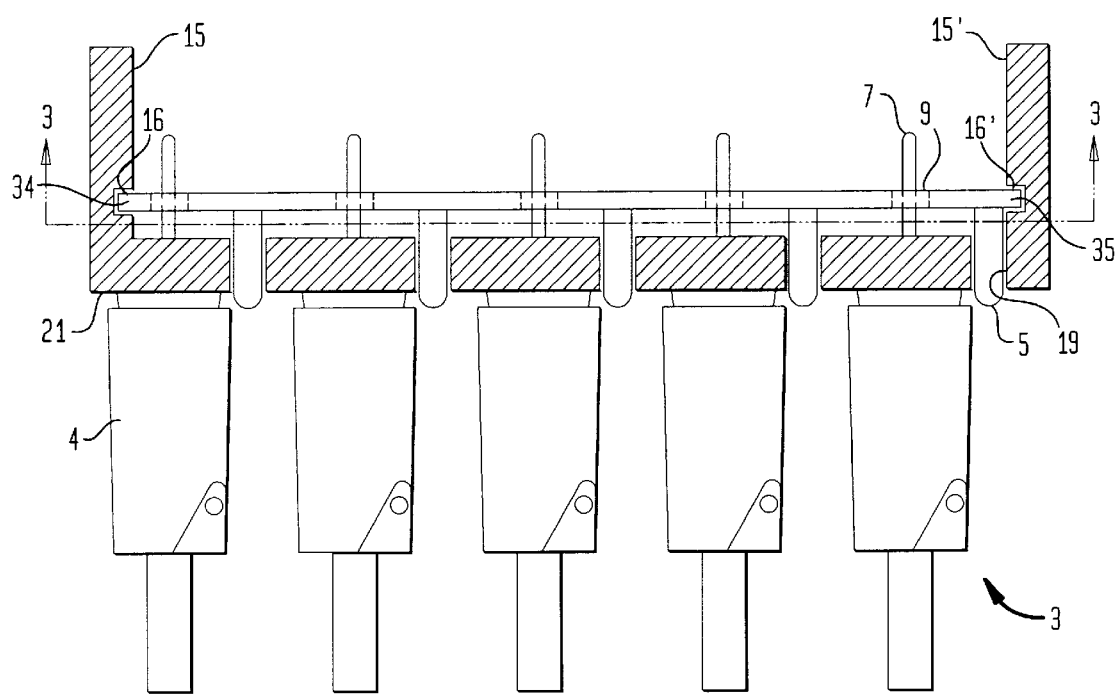
FIG. 2 is a side cross-sectional view taken along section 2—2 of FIG. 1.

As seen in FIG. 2, base 21 of connector block 3 includes a pair channeling brackets 15, 15' with one of channeling brackets 15, 15' being disposed on each side of base 21 and extending towards terminal pairs 7, 7'. One of a pair of a channels 16, 16' is formed along the entire length of each channeling bracket 15, 15'. Of course, it will be recognized that channels 16, 16' may be formed integrally in the base 21 of block 3, or may be formed by protrusions or other art recognized method, provided that a structure of sufficient length and dimension is formed for suitably slideably retaining a test board, as described in further detail hereinbelow.

A pair of mounting flanges 23 with screw holes 39 are integrally formed as part of base 21 so that connector block 3 may be easily mounted to a support structure, such as, for example, a building entrance protector(BEP), cross-connect field, junction box, network interface unit, or other art recognized structure for housing or mounting connector blocks. Of course the person of skill will recognize that numerous options exist for mounting the connector block 3 to a surface, such as, for example, snap fitting, adhesives, mounting straps and the like.

Figure 3:
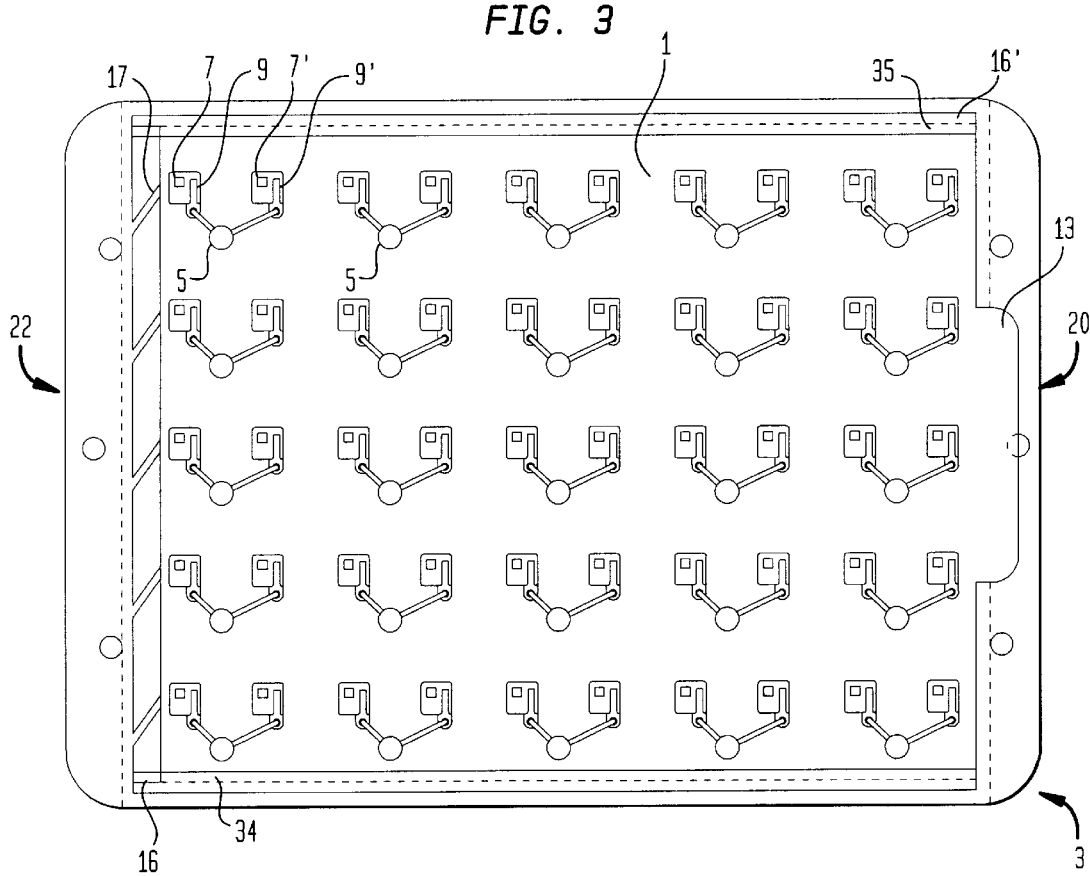
FIG. 3 is a top cross-sectional view taken along section 3—3 of FIG. 2.

Referring now to FIGS. 2–4, connector block 3 also includes a test circuit board 1 which is preferably constructed as a printed wire board (PWB), but the person of skill will recognize that it may be constructed from any suitably rigid, non-conducting material upon which the surface features and connections described herein may be formed. Test circuit board 1 has a first retaining edge 34 and a second retaining edge 35 which are slideably mounted in channels 16, 16', respectively, for permitting retained, side-to-side motion of the test board 1. An activation handle 13 is disposed on a side of test circuit board 1 adjacent a front portion 20 of connector block 3 for sliding test circuit board 1 in channels 16, 16' from an inactive position to a test position. In an exemplary embodiment, activation handle 13 is integrally formed as part of test circuit board 1, but may also be constructed by attaching to test circuit board 1 any structure suitable for permitting movement of test circuit board 1 into the test position.

Base 21 also includes a plurality of deflection springs 17 that are disposed on a rear surface portion 22 of connector block 3 in general alignment with channels 16, 16'. Deflection springs 17 are sufficiently resilient so as to bias test circuit board toward front portion 20 of connector block 3 when no opposing force is applied to activation handle 13. Although in an exemplary embodiment, deflection springs 17 are designed as resilient tabs integrally formed on rear portion 22 of base 21, it will be recognized that any biasing member suitable for biasing test circuit board 1 to the inactive position may be used, such as, by way non-limiting example, coil springs, an elastically deformable rod, elastic bands or the like.

Referring now to FIGS. 5–8, there is shown test circuit board 1 which includes a plurality of aperture pairs 11, 11'. Each aperture pair 11, 11' is positioned on test circuit board to receive a respective one of terminal pair 7, 7' when the board 1 is positioned in grooves 16, 16'. Adjacent each aperture pair 11, 11' are a pair of contact beams 9, 9' attached to test circuit board 1 and extending over aperture pairs 11, 11'. Contact beams 9, 9' are constructed from electrically conductive material, with each having a connecting point 30, 30', respectively. Each of contact beam pair 9, 9' overlies, and preferably, but not necessarily, extends into a respective one of aperture pair 11, 11'. When test circuit board 1 is moved to the test position, each contact beam 9, 9' is contacted by a respective one of terminal pair 7, 7'. Contact beams 9, 9' are preferably, but not necessarily, resilient so as to move in response to being pressed against terminals 7, 7' during testing. When configured as resilient beams which extend into apertures 11, 11', an inner wall of each aperture 11, 11' serves as a stop wall 37, 37' so as to limit the movement of contact beam pairs 9, 9'. Contact beams 9, 9' may be configured in numerous ways, and not necessarily as beams. They may, for example, fixed electrical contacts within apertures 11, 11' that contact terminals 7, 7' during testing, or wires extending across apertures, 9, 9', or any other art-recognized means of establishing an electrical contact with terminals 7. 7' when the terminals are moved into the test position.

Disposed on test circuit board 1 adjacent each aperture pair 11, 11' is a current indicator 5 which detects the presence of a current flow. In a preferred embodiment, current indicator 5 is a light-emitting diode (LED), although any electrical or electronic device that provides a visible indication of current flow may be substituted, depending on application requirements, such as, by way of non-limiting example, incandescent lamps, neon glow tubes and the like. Each current indicator 5 has a first lead 25 and a second lead 27 that are electrically connected to connection points 30, 30' of contact beams 9, 9', respectively. Each current indicator 5 associated with each aperture pair 11, 11' is adjacent to and visible through opening 19 so that current indicator 5 may be viewed from the top side of connector block 3.

Openings 19 are of sufficient size to permit the full range of motion of test board 1 without obscuring or contacting LED current indicator 5.

Figure 6:
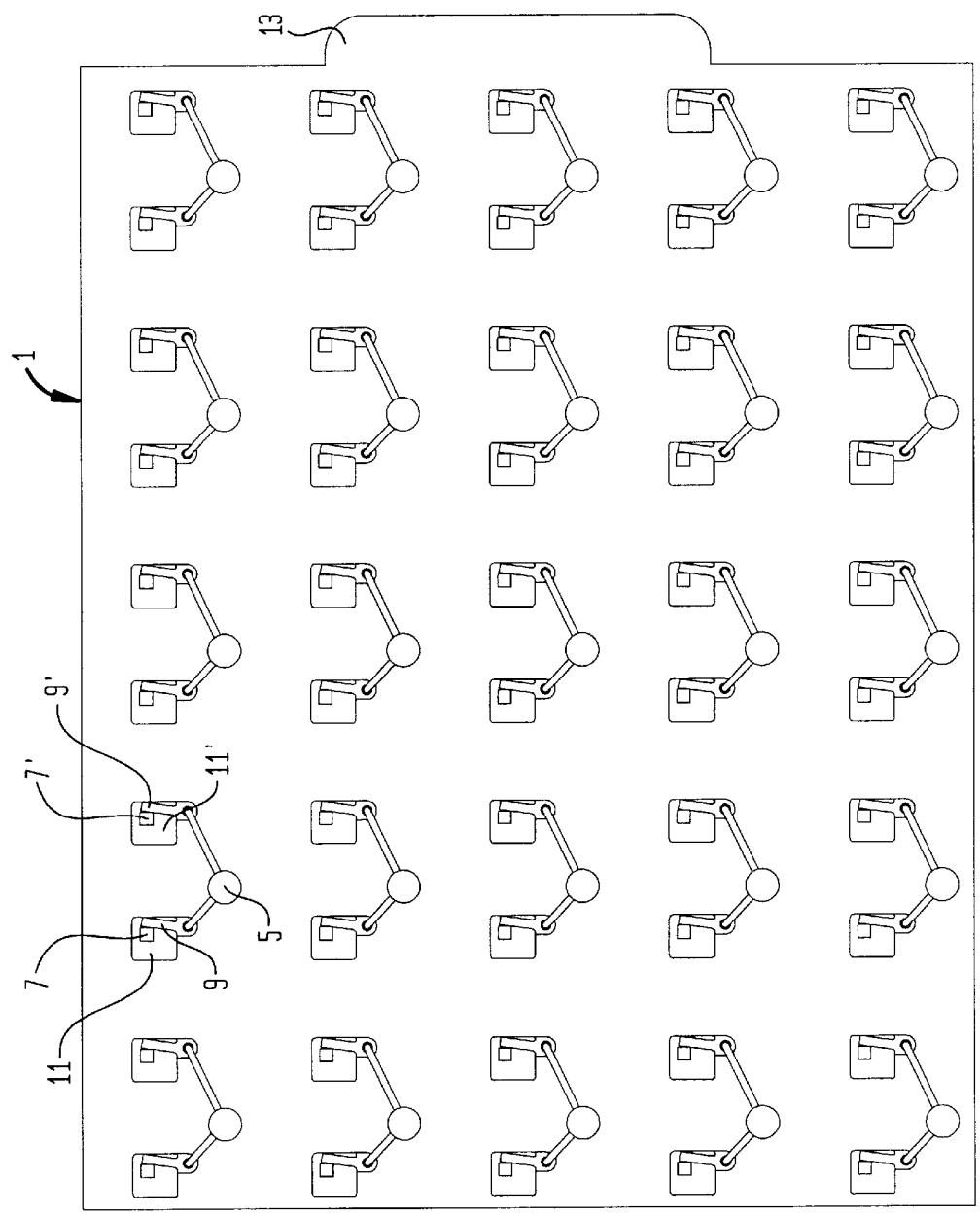
FIG. 6 is a top view of the test circuit board of the present invention in the test position.
Figure 7:
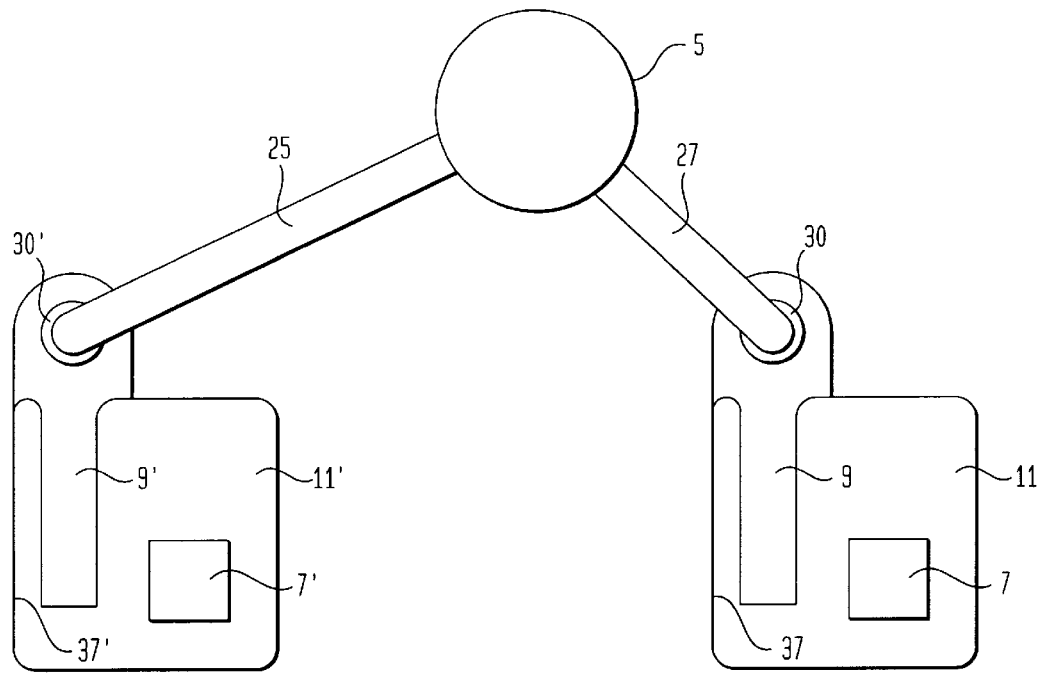
FIG. 7 is an enlarged view of a current indicator and terminal pair of the test circuit board of the present invention in the inactive position.
Figure 8:
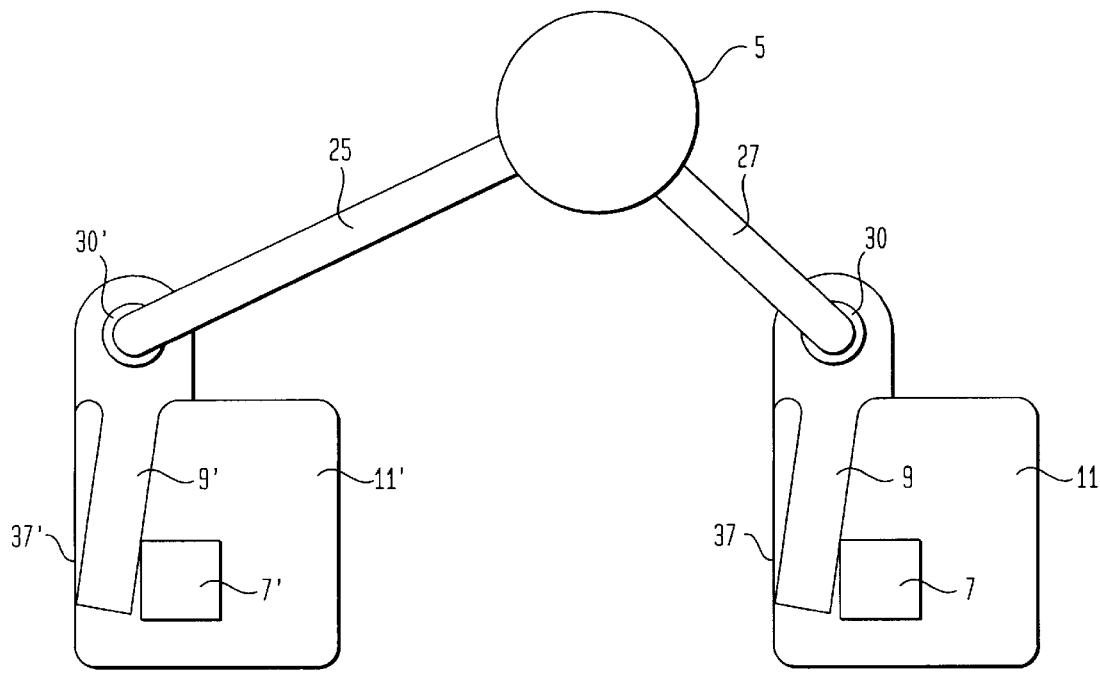
FIG. 8 is an enlarged view of a current indicator and terminal pair of the test circuit board of the present invention in the test position.

Referring now to FIGS. 5–8, the operation of test circuit board 1 of connector block 3 will be described. Normally, test circuit board 1 is biased by deflection springs 17 to the inactive position, best seen in FIG. 5. In the inactive position, contact beams 9, 9' are not in electrical contact with corresponding terminal pairs 7, 7' so that normal telephone operations between the central office and the customer telephone equipment can occur. To simultaneously test whether a loop condition exists for each tip-ring wire pair 2 connected to connector block 3, activation handle 13 is depressed so that test circuit board 1 slides in channel 16, 16' towards rear portion 22 of base 21 from the inactive position to the test position. As seen in FIG. 6, while in the test position, each of terminal 7, 7' for all terminal pairs makes contact with the associated one of contact beam 9, 9' of corresponding contact beam pairs. As a result, each current indicator 5 forms an electrical connection across corresponding terminal pair 7, 7'. If a loop condition exists between the central office and a particular tip-ring wire pair 2, current flows from the central office through that tip-ring wire pair 2 and activates corresponding current indicator 5. If current indicator 5 is not activated, a loop condition does not exist for that particular tip-ring wire pair 2 indicating either an electrical short or open condition. Therefore, by moving test circuit board 1 into the test position and observing which current indicators 5 are activated, the loop condition of all tip-ring wire pairs 2 can be easily determined simultaneously.

After the loop testing is completed, activation handle 13 is released and test circuit board 1 is biased in channel 16, 16' by deflection springs 17 to front portion 20 of base 21 from the test position to the inactive position so that normal telephone operations can resume.

When used for testing CO lines, current indicator 5 is optimized to provide visible indication upon connection to a CO line carrying 48 volts d.c. voltage, the industry standard telephone line voltage. Of course, the indicator 5 can be readily modified to detect any voltage level, as a matter of application specific design choice, making it readily adaptable for use with other systems, such as PBXs, key systems, electronic key systems, or data networks, for example.

Additionally, the indicator can assist in problem diagnosis. For example, while a fully lit indicator is indicative of a proper connection, and an unlit indicator is indicative of a short or open, a partially lit indicator can be indicative of a faulty or incomplete connection, or an impedance mismatch, such as are caused by unwanted bridge taps. A flickering indicator is also indicative of such problems. Thus, it is not necessary for the indicator to be a "binary" (good or bad only) indicator.

Moreover, although the present invention was illustrated by way of connector block 3 that interfaces between a central office and the customer telephone equipment, it is obvious to one of ordinary skill in the art to adapt the present invention to wiring blocks of various types and sizes for uses that are unrelated to telephone systems where simultaneously testing an array of wires connections for electrical continuity is desirable.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

I claim:

1. A connector block having a test device, comprising:
    a first terminal for connection to a first wire of a pair of wires;
    a second terminal for connection to a second wire of said pair of wires;
    a test board moveably mounted on said connector block for movement between a test position and an inactive position; and
    an indicator disposed on said test board, such that when said test board is moved into said test position, said indicator forms an electrical connection between said first terminal and said second terminal for indicating the presence of an electric current.

2. The connector block of claim 1, wherein when said test board is moved to said inactive position, said indicator forms no electrical connection between said first terminal and said second terminal.

3. The connector block of claim 1, wherein said indicator is a light-emitting diode.

4. The connector block of claim 2, wherein said test board has a first aperture and a second aperture for respectively receiving said first terminal and said second terminal for movement therein when said test board is moved from said test position to said inactive position.

5. The connector block of claim 4, wherein said current indicator has a first lead and a second lead; and further comprising a first contact and a second contact mounted on said test board adjacent said first aperture and said second aperture, respectively, said first contact and said second contact being electrically coupled to said first lead and said second lead, respectively, said first contact and said second contact being electrically coupled with said first terminal and said second terminal, respectively, when said test board is in said test position, and not electrically coupled when said test board is in said inactive position.

6. The connector block of claim 5, wherein said first contact and said second contact are each flexible metallic contacts, and wherein said first aperture has as first stop wall and said second aperture has a second stop wall, said first stop wall and said second stop wall limiting flexure of said first contact and said second contact, respectively, when said test board is in said test position.

7. The connector block of claim 2, wherein said wiring block includes a biasing member for biasing said test board to said inactive position.

8. The connector block of claim 2, wherein said test board has an activation handle for exerting a sliding force on said test board so as to move said test board from said inactive position to said test position.

9. The connector block of claim 1, wherein said connector block has a top side and a bottom side, said test board being slideably mounted on said bottom side of said connector block, said current indicator being visible from said top side of said connector block through an aperture in said connector block.

10. The connector block of claim 9, wherein said connector block has a pair of channeling brackets extending towards said bottom side of said connector block, each of said channeling brackets forming a channel for slideably receiving said test board.

11. The connector block of claim 1, wherein said pair of wires are a tip-ring wire pair of a telephone line from a telephone central office.

12. A connector block having a test device for testing the continuity of a plurality of individual pairs of wires connected to said block, comprising:
- a plurality of first terminals, each of said plural first terminals being connectable to a first wire of a respective selected one of said plural pairs of wires;
- a plurality of second terminals, each of said plural second terminals being connectable to a second wire of said respective selected one of said plural pairs of wires;
- a test board slideably mounted on said connector block for slideable movement between a test position and an inactive position; and
- a plurality of current indicators disposed on said test board, each of said plural current indicators being adjacent to one of said plural first terminals and one of said plural second terminals, such that when said test board is moved into said test position, each of said plural current indicators forms an electrical connection between said adjacent first terminal and said adjacent second terminal for indicating the presence of an electric current therebetween, so that continuity of each connected wire pair may be tested.

13. The test block of claim 12, wherein said pairs of wires are tip-ring pairs of wires from a telephone central office.

14. A method for testing a connector block having a pair of wires connected thereto, comprising the steps of:
- moving, from an inactive position to a test position, a test board that is slideably mounted on said connector block and that has an indicator disposed on said test board such that when said indicator is in said test position it visibly indicates if a voltage exists across said pair of wires;
- observing said indicator to determine whether a loop condition exists; and
- permitting said test board to return to said inactive position.

* * * * *